Dec. 2, 1924.

F. M. CASE 1,517,278

CASING SUPPORT AND BEAD SPREADING APPARATUS

Original Filed Aug. 30, 1919   3 Sheets-Sheet 1

Inventor.
Francis M. Case
By Brockett and Hyde
Attys.

Dec. 2, 1924.
F. M. CASE
1,517,278
CASING SUPPORT AND BEAD SPREADING APPARATUS
Original Filed Aug. 30, 1919    3 Sheets-Sheet 2
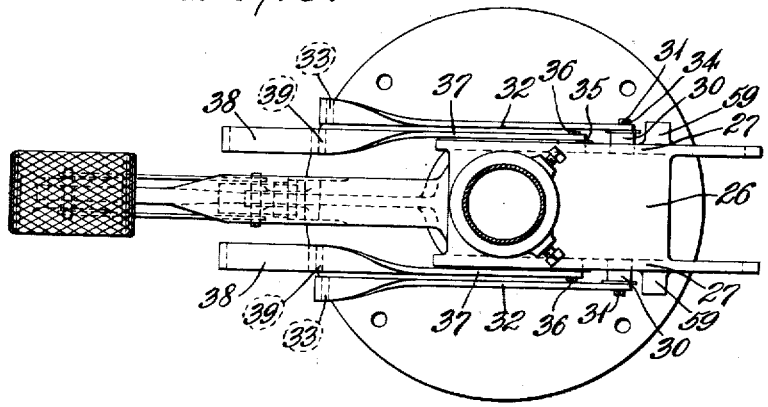
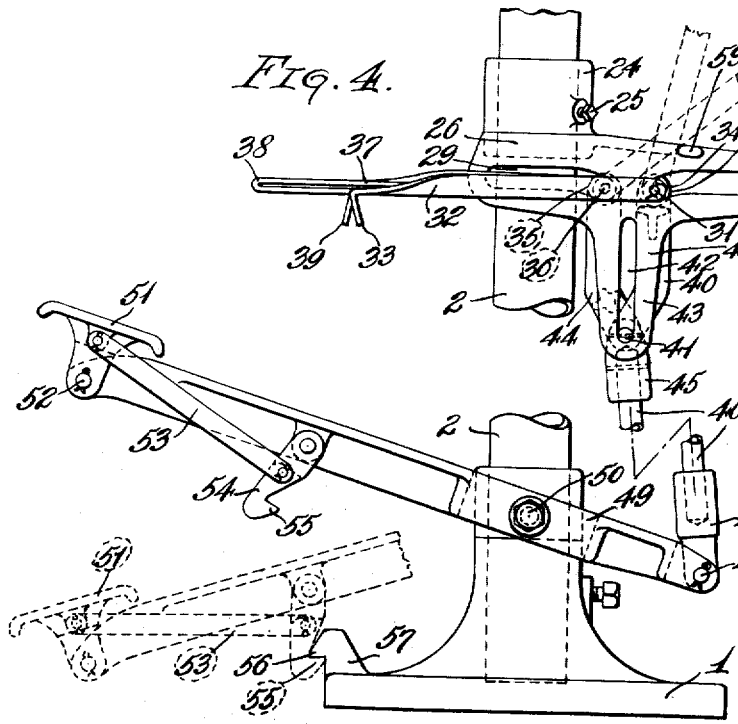
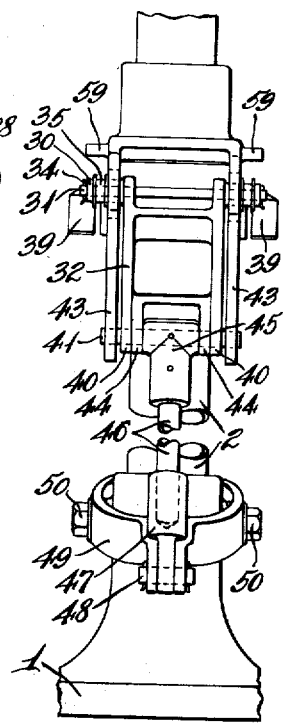
Inventor.
Francis M. Case
By Brackett and Hyde
Attys.

Dec. 2, 1924.
F. M. CASE
1,517,278
CASING SUPPORT AND BEAD SPREADING APPARATUS
Original Filed Aug. 30, 1919  3 Sheets-Sheet 3
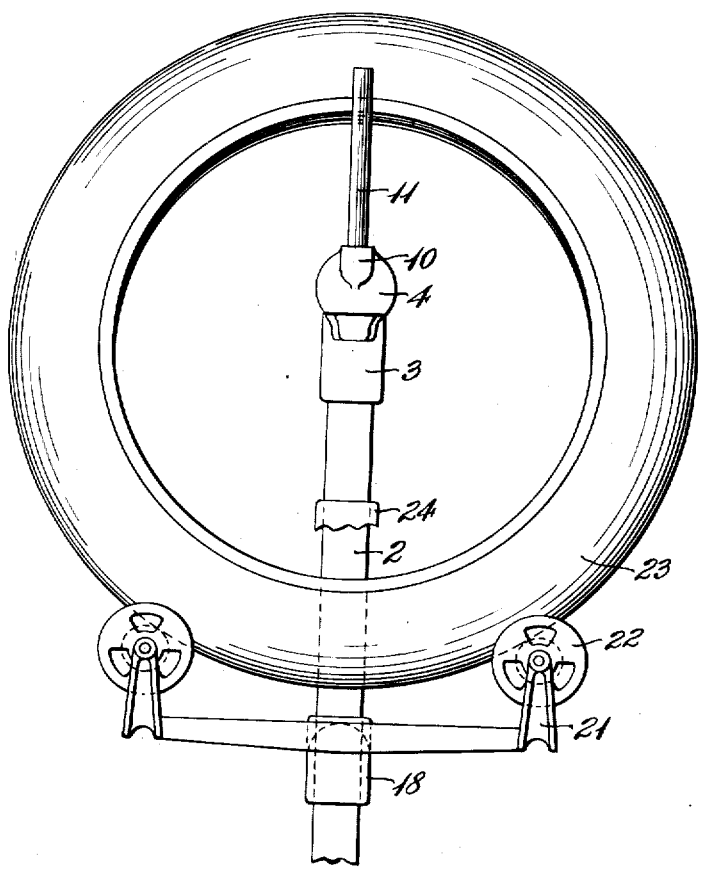
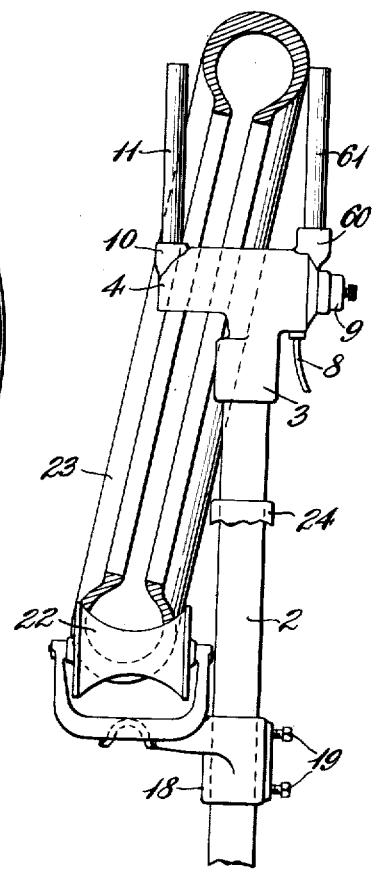
Inventor.
Francis M. Case
By Brockett and Hyde
Attys.

Patented Dec. 2, 1924.

1,517,278

UNITED STATES PATENT OFFICE.

FRANCIS M. CASE, OF CLEVELAND, OHIO, ASSIGNOR TO EARLE RAMSDELL, OF CLEVELAND, OHIO.

CASING SUPPORT AND BEAD-SPREADING APPARATUS.

Application filed August 30, 1919, Serial No. 320,794. Renewed October 17, 1924.

*To all whom it may concern:*

Be it known that I, FRANCIS M. CASE, a citizen of the United States, residing at Cleveland, in the county of Cuyahoga and State of Ohio, have invented certain new and useful Improvements in Casing Supports and Bead-Spreading Apparatus, of which the following is a specification.

This invention relates to tire supporting devices and particularly to that type utilized for holding a tire casing in a substantially vertical plane and elevated from the floor so that it may be inspected or the inner tube manipulated therein.

Tire casings are extremely awkward and unwieldly to handle and especially so when being manipulated for the spreading of the beads for inspection, the application of an inner tube thereto or for any other purpose. One reason for the difficulty arises from the stiffness and weight of the casing and from the fact that it requires both hands to spread the beads. Another difficulty arises from the fact that when the hands are being used to spread the bead the operator must rely upon his knees or some other support for the casing. The present invention, therefore, is designed to provide an improved support for the casing so that it may be more handily and practically supported and to provide spreading means attached to the support in such a manner that the operator may use his foot in spreading the bead, thus freeing his hands for manipulating the casing.

Other features of the invention will more fully appear from the following description, drawings, and claims.

Figure 1:
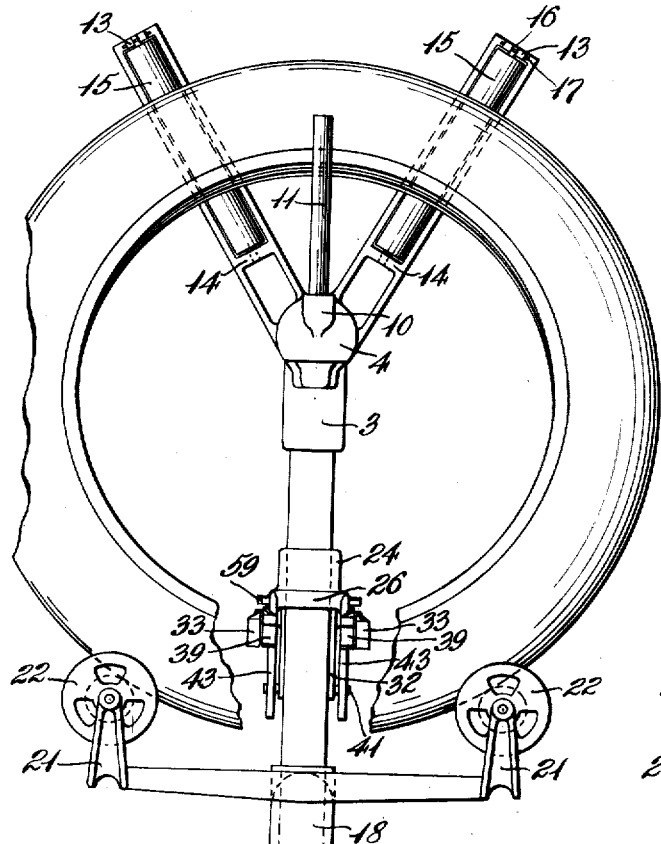
Figure 2:
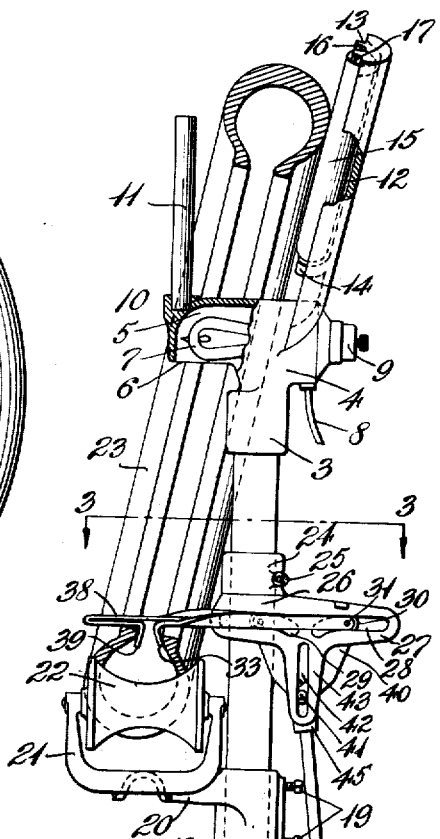

Referring to the drawings, Fig. 1 is a front elevation of one embodiment of the invention; Fig. 2 is a side elevation with parts in section; Fig. 3 is a sectional plan view upon the line 3—3, Fig. 2, the supporting rollers and tire being omitted; Fig. 4 is a side elevation of parts of the supporting post with the bead spreading device shown in elevation; Fig. 5 is a rear elevation of the parts shown in Fig. 4; Fig. 6 is a front elevation of a modified form of the upper structure; and Fig. 7 is a side elevation of this same modification with the tire casing shown in section.

In the embodiment shown in the drawings, 1 represents a base provided with a suitable upright or standard 2 which is of suitable size and height to receive the several parts of the mechanism. Secured to the upper end of this support 2 is a socket 3 forming a part of a head member 4 preferably provided with a chambered casing 5 having an opening 6 in the bottom and at the front. This chambered casing 5 receives a suitable lamp bulb 7 supported in a socket, not shown but of the usual construction. Current is supplied to the lamp by a lead line 8, the flow being controlled by any suitable switch 9 preferably mounted in the back of the head member 4. The head member 4 is provided near its front end with an upwardly extending socket 10 receiving an upwardly extending bar or rod 11. This upwardly extending bar prevents the tire casing from swinging forward, as will appear. The head member 4 is still further provided with upwardly extending diagonally disposed casing supporting arms, each of which comprises a trough portion 12 having upper and lower bearings 13, 14. Between these bearings is a roller 15 having trunnions 16 engaging in the bearings and held therein by suitable pins 17.

At a suitable distance from the base the standard 2 is provided with a sleeve 18 adapted to be held in any adjusted position by a suitable set screw or screws 19. This sleeve forms a part of a forwardly extending bracket 20, extending laterally on each side of the standard, and at each end provided with a suitable yoke 21 forming a bearing and support for a grooved supporting roller 22. The mounting and arrangement of these rollers are such that they will support a tire casing, shown at 23, in such position that it will lie behind the bar 11 and against the rollers 15 in a substantially vertical position. It is preferable to arrange the rollers 22 and 15 in such manner that the casing is slightly inclined towards the rear, as shown, whereby it normally rests against the rollers 15. The bar 11, however, prevents any accidental forward movement of the upper portion of the casing.

The device as already described is practical for use in inspecting casings, in applying inner tubes thereto, and in fact in connection with any work which is to be performed upon a casing but in the inspection of a casing and in the application of a tube thereto it is important that the beads should be spread. For this purpose and to leave the operator's hands free, for tube and casing manipulation, a suitably operated bead spreader is provided. This spreader comprises a sleeve 24 adjustably mounted upon the standard 2 by suitable set screws 25, and having a body portion 26 provided with downwardly extending plate portions 27 on each side thereof. These plate portions preferably extend to the rear of the body portion, as shown in Fig. 3, and are both provided with pairs of slots 28 and 29. The rear slot 28, in each case, is curved downwardly and forwardly as shown in Fig. 2, and the front slot 29 in each case is inclined downwardly and rearwardly. The rear slots 28 of the two side plate portions 27, receive rollers 30 mounted on pins 31 secured in a rear spreader frame 32, as shown in Fig. 5. Outside of the rollers 30 the pins 31 support rear spreader hook members 32 each having a downwardly extending hook 33, as shown. These hook members are held in place upon these pins by cotter pins 34 or any other suitable devices. Engaging in the forward slots 29 of the two side plate portions 27 are rollers 35 which are mounted upon pins 36 secured in the forward spreader member 37. Outside of the rollers 35 the pins 36 receive forward spreader hook members 37 extending forwardly to form handles 38. These forward hook members are also provided with hooks 39 preferably formed by bending back the metal of the forward hook member. The lower end of the rear spreader member is bifurcated to form clevis portions 40 which receive a pin 41 which extends laterally in both directions and engages in slots 42 formed in downward extensions 43 forming parts of the side plate portions 27. Within the clevis portions 40 and engaging the pin 41 are clevis portions 44 of the forward spreader member. Between these clevis portions 44 and secured to the pin 41 is a T-shaped operating head 45 secured to the upper end of an operating rod 46 in turn secured at its lower end in a lower head member 47. This lower head member receives a pin 48 pivotally mounted in the rear end of a treadle member 49 which surrounds the standard 2 as shown in Fig. 5, and is pivoted to the same by suitable pivot bolts 50 on either side. This treadle lever 49 extends forward to a convenient point and at its outer end it receives a foot pad 51 pivoted upon a pin 52 secured in the treadle lever and connected by a link 53 to a latch 54 having a rearwardly extending hook 55. This hook 55 is adapted to engage a fixed hook 56 forming a part of a bracket 57 secured to the base 1. A suitable weight 58 shown in Figs. 1 and 2, is provided upon the rod 46 for normally causing the lever to move in clockwise direction and for further causing the spreading hooks to assume their collapsed relation.

The spreading hook members are pivotally mounted upon their pins as described and they may be thrown out of position by swinging them upon their pivots toward the rear. In order to support them in this rear position so that they may be reached conveniently. lugs 59 are provided on the side plate portions 27 and these lugs are arranged so that the rear hook members rest against them, the forward hook members resting against either the rollers 30 or against the lugs, the arrangement in Fig. 4 being one wherein the forward hook members rest against the lugs 59.

In the modification shown in Figs. 6 and 7, the upper head member 4 is provided with the forward socket 10 and supporting bar 11 and a rear socket member 60, receiving a rear supporting bar 61. This construction presents a simple effective upper support for the casing.

It will be seen from the foregoing that the casing may be applied by lifting it over the forward bar 11 and allowing it to engage the diagonally disposed rollers 15 or bar 61 and rest in the groove of the rollers 22. The casing is applied in this manner with the spreader hooks to the rear, but when it is desired to spread the beads of the casing these spreader hooks are thrown forward with their hooks engaging between the beads, the parts being then in the position shown in Fig. 4. When the operator wishes to spread the beads he depresses the foot treadle until it latches. He is then free to inspect the casing or to perform any other work thereon which he may desire. The spread relation of the beads may be held indefinitely by causing the foot pad to be moved forwardly when the hook 55 will engage the hook 56 and retain the parts in the position just described. The operator may, however, hold the beads spread for a short time by retaining his foot upon the treadle lever without latching it. In this way he may manipulate the casing with his hands and continually spread and release the beads until he has inspected the entire casing or until he has applied an inner tube therein or performed any other work upon the casing.

Having described my invention, I claim:—

1. A tire casing support and bead spreading apparatus, comprising a standard, upper and lower devices carried thereby for supporting the tire casing, the lower one of said devices being adjustable, a bead spreading device mounted on said standard, and means for actuating said spreading device including a treadle lever and a lock therefor.

2. A tire casing support and bead spreading apparatus, comprising a standard, upper and lower devices carried thereby for supporting the tire casing, the lower one of said devices being adjustable, a bead spreading device mounted on said standard, and means for actuating said spreading device, said means comprising a treadle lever having a movable foot plate, and locking mechanism for said treadle actuated by said plate.

3. In a tire casing support and bead spreading apparatus, a frame, casing supporting devices carried by said frame, a body portion mounted on the frame, members horizontally slidable engaging said body portion, bead spreading devices carried by said members, and means for moving said members in opposite directions.

4. In a tire casing support and bead spreading apparatus, a frame, casing supporting devices carried by said frame, a body portion mounted on the frame, members slidably engaging said body portion, oppositely disposed bead spreading devices carried by said members, and treadle mechanism for moving said slidable members in opposite directions.

5. A spreading device for tire casings, comprising a standard, a body portion secured to said standard, opposed members slidably mounted in said body portion, front and rear bead spreading members pivoted to said slidable members, and means for operating said slidable members.

6. A spreading device for tire casings, comprising a standard, a body portion secured to said standard, opposed members slidably mounted in said body portion, front and rear bead spreading members pivoted to said slidable members, and treadle mechanism for operating said slidable members to spread the tire casing.

7. A spreading device for tire casings, comprising a standard, a body portion secured to said standard, opposed members slidably mounted in said body portion, front and rear bead spreading members pivoted to said slidable members, and toggle mechanism for operating said slidable members to spread the tire casing.

8. A spreading device for tire casings, comprising a standard, a body portion secured to said standard, members slidably mounted in said body portion, front and rear bead members pivoted to said slidable members, toggle mechanism for operating said slidable members, and treadle mechanism for actuating said toggle mechanism to spread the tire casing.

9. A tire spreading device comprising a support, a body portion secured to said support, side plate portions carried by said body portion and provided with oppositely extending slots, members slidably mounted in said slots, bead spreading devices pivotally mounted upon said slidable members, and means for moving said slidable members in opposite directions in said slots.

10. A tire spreading device comprising a support, a body portion secured to said support, side plate portions carried by said body portion and provided with oppositely extending slots, members slidably mounted in said slots, bead spreading devices pivotally mounted upon said slidable members, and toggle mechanism for moving said slidable members in opposite directions in said slots.

11. A tire spreading device comprising a support, a body portion secured to said support, side plate portions carried by said body portion and provided with oppositely extending slots, members slidably mounted in said slots, bead spreading devices pivotally mounted upon said slidable members, means including toggle mechanism for moving said slidable members in opposite directions in said slots, and a treadle for operating said toggle mechanism.

12. In a combined tire support and bead spreading apparatus, a frame, roller devices carried by the frame and adapted to support the casing in a substantially vertical plane, said casing being rotatable upon said supporting device, and bead spreading devices constructed and arranged to be moved into and out of engagement with the casing from one side thereof.

13. In a combined tire support and bead spreading apparatus, a frame, roller devices carried by the frame and adapted to support the casing in a substantially vertical plane, said casing being rotatable upon said supporting device, bead spreading devices constructed and arranged to be moved into and out of engagement with the casing from the rear side thereof, and upwardly extending treadle mechanism for actuating said spreading device.

14. In a tire supporting device, a frame, a lower supporting bracket having laterally spaced bearing yokes, grooved rollers mounted in said bearing yokes, a head member mounted on the frame, and a stationary post carried thereby and lying in front of the upper part of the casing to prevent it from tilting forwardly.

15. In a tire supporting device, a frame, an adjustable lower supporting bracket having laterally spaced bearing yokes, grooved rollers mounted in said bearing yokes, a head member mounted on the frame, a casing retaining device extending in front of the casing, and another casing retaining antifriction device mounted in the head member and extending up in the rear of the casing.

16. In a tire supporting device, a frame, a lower supporting bracket having laterally spaced bearing yokes, grooved rollers mounted in said bearing yokes, a head member mounted on the frame, a casing retaining device extending in front of the casing, and another casing retaining device mounted in the head member, and provided with rollers.

17. In a tire supporting device, a frame, a lower supporting bracket having laterally spaced bearing yokes, grooved rollers mounted in said bearing yokes, a head member mounted on the frame, a casing retaining device extending in front of the casing, and another casing retaining device mounted in the head member and comprising diagonally disposed rollers spaced to the rear from said forward casing retaining member extending laterally in diagonal direction.

In testimony whereof I affix my signature.

FRANCIS M. CASE.

Certificate of Correction.

It is hereby certified that in Letters Patent No. 1,517,278, granted December 2, 1924, upon the application of Francis M. Case, of Cleveland, Ohio, for an improvement in "Casing Supports and Bead-Spreading Apparatus," errors appear in the printed specification requiring correction as follows: Page 3, line 31, claim 5, after the word "members" and before the period insert the words *to spread the tire casing*, and line 56, claim 8, strike out the words "to spread the tire casing"; same page, line 73, claim 10, before the word "toggle" insert the words *means including*, and lines 81 and 82, claim 11, strike out the words "means including"; line 106, claim 14, strike out the article "a", second occurrence, and insert instead *an adjustable*, and line 115, claim 15, strike out the words "an adjustable"; and that the said Letters Patent should be read with these corrections therein that the same may conform to the record of the case in the Patent Office.

Signed and sealed this 27th day of January, A. D. 1925.

[SEAL.]

KARL FENNING,
*Acting Commissioner of Patents.*